E. J. POST.
APPARATUS FOR MANUFACTURING PIPES FROM METAL STRIPS.
APPLICATION FILED JUNE 10, 1909.

989,045.

Patented Apr. 11, 1911.

Witnesses:
C. Heymann
H. Hensinger

Inventor
Eugen Julius Post
Attorney

UNITED STATES PATENT OFFICE.

EUGEN JULIUS POST, OF COLOGNE, GERMANY.

APPARATUS FOR MANUFACTURING PIPES FROM METAL STRIPS.

989,045.  Specification of Letters Patent.  Patented Apr. 11, 1911.

Application filed June 10, 1909. Serial No. 501,369.

*To all whom it may concern:*

Be it known that I, EUGEN JULIUS POST, a subject of the German Emperor, and resident of Cologne, Germany, have invented a certain new and useful Apparatus for Manufacturing Pipes from Metal Strips, of which the following is a specification.

The processes heretofore known for manufacturing pipes in the cold by bending metal strips together and by welding, soldering, etc., the longitudinal joints, comprise many operations. Now, in order that the material will be capable of standing all these operations, as each of them causes it to lose more and more of its solidity and ductility, the material is annealed and pickled before another operation is carried out. This repeated annealing and especially the pickling is very objectionable, and as a result of it, the finished pipe does not possess the solidity, etc., of the raw material.

Now, the present invention relates to a process and apparatus for manufacturing pipes according to which the latter are finished by a single operation whereby the annealing and pickling of the material are entirely done away with.

Figure 1:
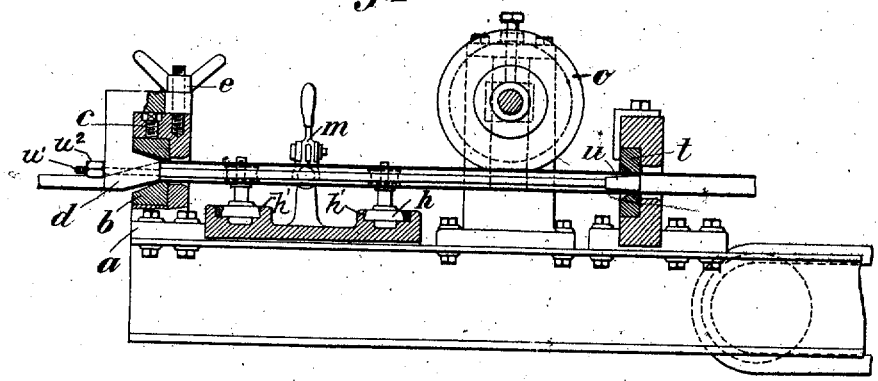
Figure 2:
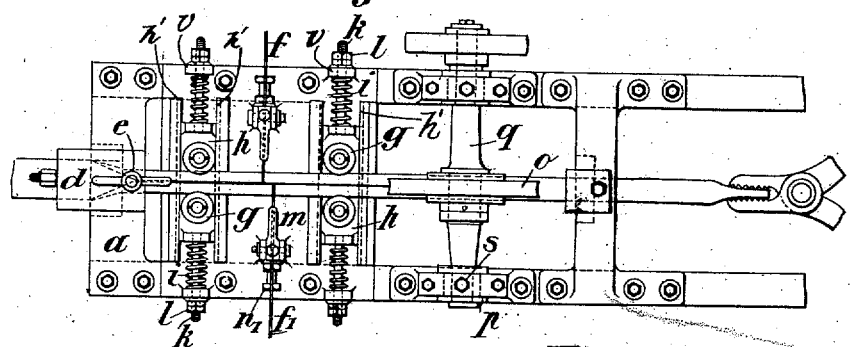
Figure 3:
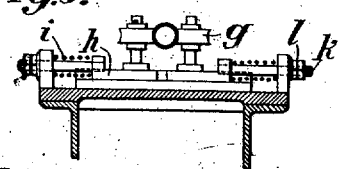
Figure 5:
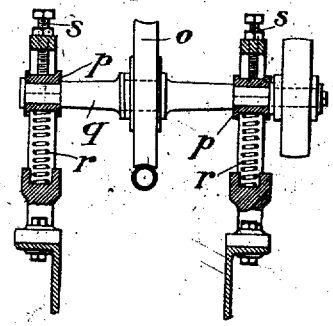
Figure 4:
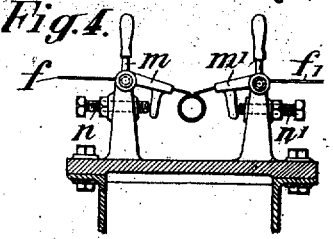

The figures of the accompanying drawing show the apparatus for carrying out this process, Figure 1 being a longitudinal section; Fig. 2 a top plan view. Fig. 3 a transverse elevation, partly in section showing the spring-controlled rollers. Fig. 4 a transverse elevation, partly in section, showing the welding means; and Fig. 5 a transverse section through the mechanism for removing the welding bur.

This apparatus comprises a draw bench carrying at one of its ends a head $a$ in which the draw plate $b$ is mounted and held by means of a screw $c$. The bending tool $d$ is mounted from the front and is held in place by a screw $e$. Now, after a metal strip has been bent in the bending tool $d$ into the shape of a slotted pipe, the edges of the strip forming the slot are welded at $f$ and $f'$. In order to prevent the pipe from opening again at the welding place owing to its elastic properties, a pair of rollers $g$ is arranged in front of and behind the latter, one pair being shown in Fig. 3. Each of these pairs of rollers $g$ is carried by a slide $h$ movable in guides $h'$. On each slide presses a spring $i$ whereby the rollers press strongly upon the pipe, thus holding the edges of the latter together. Each slide is provided with a bolt $k$, on the screw threaded part of which a nut $l$ is adjustably engaged which nut serves to limit the inward movement of the slide by coming in contact with an abutment $v$ mounted on the frame or support. The roller may therefore be adjusted for every diameter of pipe and one spring may be prevented from causing its corresponding roller to advance farther than the other whereby a crease might be produced in the pipe.

The welding can be carried out electrically with the aid of electrodes or autogenously by means of oxygen and hydrogen flames or by oxygen and acetylene. Upon particular reference to Fig. 4, the reference letters $m$ and $m'$ represent angle levers which may either carry the electrodes, if the welding is carried out electrically, or they may carry burners, when the welding is carried out by the use of flames. Each of these angle levers is provided with an arm against which the adjustable screws $n$ and $n'$, abut, in order that the electrodes or burners may be adjusted according to the diameter of the pipe. Each angle lever is provided with a handle by which the electrodes or burners may be manipulated when starting or interrupting the welding operation. As a result of the welding, a welding bur is formed on the pipe which welding bur may be removed by the rotating wheel $o$, Fig. 5, which may be for instance, an emery wheel. The bearings $p$ of the shaft $q$ carrying the emery wheel rest on springs and are adjusted by the screws $s$, so as to suit the diameter of the pipe being manufactured. Now, after the bur formed by the welding operation has been removed from the pipe, the latter receives the exact desired outer diameter in a matrix $t$. When the pipes must also have a uniform inner diameter, the latter is gaged at the same time. To this end the mandrel $u$ is mounted in the pipe so that the walls of the pipe are between the mandrel and the matrix $t$. The mandrel is provided with a longitudinal extension of smaller diameter which runs the length of the machine and is provided on its threaded end $u'$ with a nut $u^2$ which serves as an abutment against the bending tool $d$.

The work is carried out in the following manner on this draw bench: First a round iron rod, which is thinner than a finished pipe, is connected by welding or otherwise with the metal strip of which the pipe is to be made. When the material is thin the metal strip can be wound on a wheel whereby very long pipes can be made by one drawing operation. When, however, the metal strip is thicker, straight bars of the latter are used. The aforesaid round iron rod is passed through the plate $b$ (the bending tool $d$ has not yet been put into place,) then between the rollers $g$, under the emery wheel $o$ and through the gage matrix $t$ where it is grasped by the drawing pliers. The bending tool $d$ is thereafter mounted in the bench and the latter is set going. Thus the slotted pipe is formed by the tools $b$, $d$ from the metal strip. The electrodes or burners are applied against the pipe so as to start the welding. Thereafter the emery wheel is caused to rotate whereby the welding bur is removed. The pipe is thereafter drawn through the matrix $t$ by which the desired outer diameter is obtained and at the same time the outside surface of the pipe is rendered smooth and clean. When it is desired at the same time to gage exactly the inner diameter, the bench is stopped when the round iron rod welded to the pipe is well past the gaging matrix $t$. Then the said round iron rod and a small length of the pipe are cut off about 100 to 120 millimeters behind the matrix $t$. After this the drawing mandrel $u$ is introduced into the opening of the pipe where the pipe was cut until the extension of its shaft abuts with its shoulder against the bending tool $d$. This end of the mandrel is secured to the bending tool $d$ or to the bench itself. The end of the pipe which projects from the gaging matrix $t$ is then closed by means of hammer blows as represented in Fig. 2, and is grasped by the drawing pliers after the bench has been started again, after which the entire metal strip is drawn through the bench without stopping the latter.

By the use of this apparatus pipes may be manufactured in one piece having any length up to fifty meters.

I claim:

1. In a machine for forming a pipe from a sheet of metal, a suitable support, a guide-way mounted upon said support, a pair of slides movable in said guide-way, a roller mounted upon each of said slides, said rollers being mounted with reference to each other so that they may engage a pipe passing between them and a spring arranged on each of said slides for urging the slides toward each other.

2. In a machine for forming a pipe from a sheet of metal, a suitable support, a guideway mounted upon said support, a pair of slides movable in said guide-way, a roller mounted upon each of said slides, a spring arranged on each of said slides for urging said slides toward each other, said rollers being mounted with reference to each other so that they may engage a pipe passing between them when said slides have reached the limit of their movement toward each other and means for limiting the movement of said slides.

3. In a machine for forming a pipe from a sheet of metal, a suitable support, a guideway mounted upon said support, a pair of slides movable in said guide-way, a roller mounted upon each of said slides, a spring arranged on each of said slides for urging the slides toward each other, said rollers being mounted with reference to each other so that they may engage a pipe passing between them when said slides have reached the limit of their movement toward each other and adjustable means for limiting the movement of said slides.

4. In a machine for forming a pipe from a sheet of metal, a suitable support, a guide-way mounted upon said support said guide-way consisting of a pair of substantially parallel ways, a pair of slides movable in said guide-way, a roller mounted upon each of said slides, a spring arranged on each slide for urging said slides toward each other, said rollers being mounted with reference to each other so that they may engage a pipe passing between them when said slides have reached the limit of their movement toward each other and adjustable means for limiting the movement of said slides.

5. In a machine for forming a pipe from a sheet of metal, a suitable support, a guideway mounted upon said support said guide-way consisting of two substantially parallel ways, a pair of slides horizontally movable in said guide-way, a vertically extending stem mounted upon each of said slides, a roller carried by each of said stems, a spring arranged upon each of said slides for urging said slides toward each other, said rollers being mounted with reference to each other so that they may engage a pipe passing between them when said slides have reached the limit of their movement toward each other and adjustable means for limiting the movement of each of said slides.

6. In a machine for forming a pipe from a sheet of metal, a suitable support, a guideway mounted upon said support, a slide movable in said guide-way, a roller mounted upon said slide, a spring to urge said slide in a desired direction, a bolt connected to said slide said bolt being screw-threaded at its free end, a nut adjustable on said screw-threaded portion of said bolt, and an abutment mounted on said frame work for engagement with said nut, substantially as described.

In testimony whereof I have hereunto set my hand in presence of two witnesses.

EUGEN JULIUS POST.

Witnesses:
 LOUIS VANDORY,
 KETHEE MERZLACH.